United States Patent
Somerville et al.

(10) Patent No.: US 12,275,894 B2
(45) Date of Patent: Apr. 15, 2025

(54) LIGNIN-BASED FRACTURING FLUIDS AND RELATED METHODS

(71) Applicant: LignoSol IP Limited, San Gwann (MT)

(72) Inventors: Desmond Alexander Somerville, San Gwann (MT); Patrick Dieter Waibel, San Gwann (MT)

(73) Assignee: LignoSol IP Limited, San Gwann (MT)

( * ) Notice: Subject to any disclaimer, the term of this patent is extended or adjusted under 35 U.S.C. 154(b) by 0 days.

(21) Appl. No.: 18/285,536

(22) PCT Filed: Apr. 5, 2022

(86) PCT No.: PCT/IB2022/053160
§ 371 (c)(1),
(2) Date: Oct. 4, 2023

(87) PCT Pub. No.: WO2022/214960
PCT Pub. Date: Oct. 13, 2022

(65) Prior Publication Data
US 2024/0182780 A1    Jun. 6, 2024

(30) Foreign Application Priority Data

Apr. 6, 2021 (GB) ..................................... 2104859
Nov. 8, 2021 (GB) ..................................... 2115987

(51) Int. Cl.
*C09K 8/68* (2006.01)
*C09K 8/60* (2006.01)
(Continued)

(52) U.S. Cl.
CPC ............... *C09K 8/68* (2013.01); *C09K 8/602* (2013.01); *C09K 8/703* (2013.01); *C09K 8/80* (2013.01);
(Continued)

(58) Field of Classification Search
CPC ....... C09K 8/805; E21B 43/267; E21B 43/26; E21B 43/16
See application file for complete search history.

(56) References Cited

U.S. PATENT DOCUMENTS 3,438,895 A    4/1969    Edmonsond et al.
4,101,394 A    7/1978    Johnson
(Continued)

FOREIGN PATENT DOCUMENTS

CA    1132452 A    9/1982
CA    2425424 A1    4/2002
(Continued)

OTHER PUBLICATIONS

Beisl et al., "Lignin from Micro- to Nanosize: Production Methods." Int. Journal of Molecular Sciences. 18(6): 1244 (Jun. 10, 2017) (31 pages).
(Continued)

*Primary Examiner* — Zakiya W Bates
(74) *Attorney, Agent, or Firm* — Clark & Elbing LLP

(57) ABSTRACT

Fracturing or fracking fluids for fracturing a subterranean reservoir for hydrocarbon recovery and related methods are described. The fluid comprises lignin, in particular technical lignin, and at least one strain of bacteria capable of biosurfactant production and/or a biosurfactant produced by at least one such isolated strain of bacteria. Also described is a fracturing method for recovering hydrocarbons from a subterranean formation.

19 Claims, 2 Drawing Sheets

(51) Int. Cl.
*C09K 8/70* (2006.01)
*C09K 8/80* (2006.01)
*E21B 43/267* (2006.01)

(52) U.S. Cl.
CPC ........ *E21B 43/267* (2013.01); *C09K 2208/10* (2013.01)

(56) References Cited

U.S. PATENT DOCUMENTS

| | | | |
|---|---|---|---|
| 4,133,385 | A | 1/1979 | Kalfoglou |
| 4,304,572 | A | 12/1981 | Wiese et al. |
| 4,392,941 | A | 7/1983 | Roth et al. |
| 4,877,517 | A | 10/1989 | Bulatovic et al. |
| 5,028,238 | A | 7/1991 | von Rybinski et al. |
| 5,114,597 | A | 5/1992 | Rayborn et al. |
| 5,164,480 | A | 11/1992 | Huibers et al. |
| 5,246,602 | A | 9/1993 | Forrest |
| 5,248,329 | A | 9/1993 | Rusin et al. |
| 5,316,664 | A | 5/1994 | Gregoli et al. |
| 5,344,625 | A | 9/1994 | Clough |
| 5,368,972 | A | 11/1994 | Yamashita et al. |
| 5,911,276 | A | 6/1999 | Kieke |
| 6,306,800 | B1 | 10/2001 | Samuel et al. |
| 6,348,436 | B1 | 2/2002 | Langlois et al. |
| 8,450,260 | B2 | 5/2013 | Crawford et al. |
| 8,455,226 | B2 | 6/2013 | De Windt et al. |
| 8,748,153 | B2 | 6/2014 | Tadic et al. |
| 10,362,786 | B2 | 7/2019 | Chen et al. |
| 10,829,833 | B2 | 11/2020 | Gos et al. |
| 2002/0044887 | A1 | 4/2002 | Jones |
| 2006/0177661 | A1* | 8/2006 | Smith ............ C09K 8/66 166/280.2 |
| 2009/0082227 | A1 | 3/2009 | Hnatow et al. |
| 2009/0266541 | A1 | 10/2009 | Reynolds et al. |
| 2009/0291861 | A1* | 11/2009 | Sawdon ............ C09K 8/08 507/110 |
| 2010/0137168 | A1 | 6/2010 | Quintero et al. |
| 2010/0233050 | A1 | 9/2010 | Gargulak et al. |
| 2012/0247763 | A1 | 10/2012 | Rakitsky et al. |
| 2013/0274150 | A1 | 10/2013 | Holt et al. |
| 2014/0371071 | A1 | 12/2014 | Nitsche |
| 2015/0166836 | A1 | 6/2015 | Liu et al. |
| 2015/0285051 | A1 | 10/2015 | Miller et al. |
| 2016/0168272 | A1 | 6/2016 | Retsina et al. |
| 2017/0029691 | A1 | 2/2017 | Faust, Jr. et al. |
| 2018/0148632 | A1 | 5/2018 | Bennett et al. |
| 2018/0265794 | A1 | 9/2018 | Dahlstrand et al. |
| 2018/0355446 | A1 | 12/2018 | Medoff et al. |
| 2019/0031945 | A1 | 1/2019 | Guo et al. |
| 2019/0055459 | A1 | 2/2019 | Zelenev et al. |
| 2019/0093463 | A1 | 3/2019 | Hardin et al. |
| 2019/0382649 | A1 | 12/2019 | Jiang et al. |
| 2019/0390405 | A1 | 12/2019 | Geigle et al. |
| 2020/0032128 | A1 | 1/2020 | Farmer et al. |
| 2020/0157408 | A1 | 5/2020 | Farmer et al. |
| 2020/0172788 | A1 | 6/2020 | Farmer et al. |
| 2020/0255466 | A1 | 8/2020 | Lintinen et al. |

FOREIGN PATENT DOCUMENTS

| | | |
|---|---|---|
| CA | 2535702 A1 | 3/2005 |
| CA | 2547100 A1 | 11/2006 |
| CA | 2640005 A1 | 8/2007 |
| CA | 2661202 C | 11/2011 |
| CA | 2723591 C | 7/2013 |
| CA | 2705147 C | 9/2014 |
| CA | 2921996 A1 | 3/2015 |
| CA | 2693008 C | 4/2016 |
| CA | 2988826 A1 | 12/2016 |
| CA | 2791256 C | 6/2017 |
| CA | 3048404 A1 | 7/2018 |
| CA | 3052048 A1 | 8/2018 |
| CA | 3052465 A1 | 8/2018 |
| CA | 3054686 A1 | 9/2018 |
| CA | 3058761 A1 | 10/2018 |
| CA | 2999599 C | 12/2019 |
| CA | 2772395 C | 1/2020 |
| CA | 2720739 C | 4/2020 |
| CA | 2950089 C | 4/2020 |
| CA | 2831902 C | 5/2020 |
| CA | 2877367 C | 12/2020 |
| CA | 2945194 C | 7/2022 |
| CA | 2886934 C | 1/2023 |
| CN | 85105225 A | 7/1986 |
| CN | 101104177 A | 1/2008 |
| CN | 104152129 A | 11/2014 |
| CN | 104321422 A | 1/2015 |
| CN | 103636599 B | 3/2015 |
| CN | 106188857 A | 12/2016 |
| CN | 108441223 A | 8/2018 |
| CN | 106217826 B | 9/2018 |
| CN | 109943299 A | 6/2019 |
| CN | 110616062 A | 12/2019 |
| JP | 2017029892 A | 2/2017 |
| RU | 2188935 C1 | 9/2002 |
| WO | WO-2005/028592 A1 | 3/2005 |
| WO | WO-2012/151524 A2 | 11/2012 |
| WO | WO-2013/037643 A1 | 3/2013 |
| WO | WO-2015/065981 A1 | 5/2015 |
| WO | WO-2016/053345 A1 | 4/2016 |
| WO | WO-2016/196680 A1 | 12/2016 |
| WO | WO-2019/067356 A1 | 4/2019 |
| WO | WO-2019/112970 A1 | 6/2019 |
| WO | WO-2019/191296 A1 | 10/2019 |
| WO | WO-2019/213055 A1 | 11/2019 |
| WO | WO-2020/028253 A1 | 2/2020 |
| WO | WO-2020/060529 A1 | 3/2020 |
| WO | WO-2020/149756 A2 | 7/2020 |
| WO | WO-2020/264073 A1 | 12/2020 |
| WO | WO-2021/052939 A1 | 3/2021 |

OTHER PUBLICATIONS

Bicca et al., "Production of Biosurfactant by Hydrocarbon Degrading Rhodococcus Ruber and Rhodococcus Erythropolis." Revista de Microbiologia. 30: 231-236 (1999) (6 pages).

Chang et al., "A novel nano-lignin-based amphoteric copolymer as fluid-loss reducer in water-based drilling fluids." Colloids and Surfaces A. 583:123979 (Sep. 21, 2019) (10 pages).

Hruzová et al., "Organosolv lignin hydrophobic micro- and nanoparticles as a low-carbon footprint biodegradable flotation collector in mineral flotation." Bioresource Technology. 306:123235 (Mar. 23, 2020) (4 pages).

International Search Report and Written Opinion for International Application No. PCT/IB22/53145 mailed Jun. 27, 2022 (9 pages).
International Search Report and Written Opinion for International Application No. PCT/IB22/53147 mailed Jun. 15, 2022 (9 pages).
International Search Report and Written Opinion for International Application No. PCT/IB22/53148 mailed Jun. 27, 2022 (9 pages).
International Search Report and Written Opinion for International Application No. PCT/IB22/53151 mailed Jun. 29, 2022 (9 pages).
International Search Report and Written Opinion for International Application No. PCT/IB22/53158 mailed Jun. 21, 2022 (8 pages).
International Search Report and Written Opinion for International Application No. PCT/IB22/53160 mailed Jun. 29, 2022 (7 pages).
International Search Report and Written Opinion for International Application No. PCT/IB22/53161 mailed Jun. 27, 2022 (6 pages).
International Search Report and Written Opinion for International Application No. PCT/IB22/53162 mailed Jul. 1, 2022 (7 pages).

Li, Qingxin, "Rhamnolipid synthesis and production with diverse resources." Front. Chem. Sci. Eng. 11(1): 27-36 (Mar. 22, 2017) (10 pages).

Negi et al., "A review on lignin utilization in petroleum exploration, petroleum products formulation, bio-fuel production, and oil spill clean-up." Biomass Conversion and Biorefinery. 13: 1417-1428 (Nov. 5, 2020) (12 pages).

Sauki et al., "Extracted Lignin from Rhizophora's Black Liquor as Fluid Loss Control Additive in Water Based Drilling Mud." Key Engineering Materials. 755: 74-80 (Aug. 20, 2018) (8 pages).

(56) References Cited

OTHER PUBLICATIONS

Schneider et al., "Assessment of Morphological, Physical, Thermal, and Thermal Conductivity Properties of Polypropylene/ Lignosulfonate Blends." Materials. 14(3): 543 (Jan. 23, 2021) (10 pages).
Search and Examination Report for Application No. GB2104859.0, dated May 11, 2021 (8 pages).
Search and Examination Report for Application No. GB2104860.8, dated May 4, 2021 (8 pages).
Search and Examination Report for Application No. GB2104862.4, dated May 21, 2021 (8 pages).
Search and Examination Report for Application No. GB2104865.7, dated Jun. 8, 2021 (8 pages).
Search and Examination Report for Application No. GB2104869.9, dated Apr. 16, 2021 (6 pages).
Search and Examination Report for Application No. GB2104870.7, dated Jun. 2, 2021 (7 pages).
Search and Examination Report for Application No. GB2104877.2, dated May 10, 2021 (6 pages).
Search and Examination Report for Application No. GB2104883.0, dated May 4, 2021 (8 pages).
Search and Examination Report for Application No. GB2115987.6, dated Dec. 15, 2021 (6 pages).
Solihat et al., "Lignin as an Active Biomaterial: A Review." Jurnal Sylva Lestari. 9(1): 1-22 (Jan. 2021) (22 pages).
Extended European Search Report (EESR), Search Opinion, and Supplementary Search Report for EP4320192, dated Jan. 17, 2025 (11 pages).

\* cited by examiner

LIGNIN-BASED FRACTURING FLUIDS AND RELATED METHODS

CROSS-REFERENCE TO RELATED APPLICATIONS

This application claims priority to GB Provisional Patent Application No. 2104859.0, filed 6 Apr. 2021, and GB Provisional Patent Application No. 2115987.6, filed 8 Nov. 2021, the disclosures of which are hereby incorporated by reference in their entireties.

BACKGROUND OF THE INVENTION

The present disclosure relates to fracturing or fracking fluids. More particularly, the present disclosure relates to lignin-based fracturing or fracking fluids for fracturing subterranean reservoirs for recovery of hydrocarbons and related methods.

Hydrocarbons, including natural gas and oil (petroleum), may be extracted from subterranean reservoirs by a variety of means. In conventional reservoirs, the hydrocarbon is present in discrete accumulations or pools from which the hydrocarbons can readily be extracted via vertical wells drilled into the reservoir. In contrast, unconventional reservoirs typically have low permeability and/or porosity and thus require specialized techniques to extract the hydrocarbons therein.

Some unconventional reservoirs require hydraulic fracturing or "fracking" to allow the hydrocarbons therein to be extracted. Fracking typically involves high-pressure injection of the fracturing or fracking fluid such as "slick water" into a wellbore to create cracks in rock formations through which hydrocarbons may flow more freely. However, conventional fracking methods may require large volumes of water and may also include environmentally harmful chemicals in the fracking fluid. Processing the produced water from such operations may require costly water treatment methods.

SUMMARY OF THE INVENTION

In one aspect of the invention, there is provided a method for fracturing a subterranean reservoir, the method comprising:
  providing a fracturing fluid comprising lignin and at least one isolated strain of bacteria capable of producing at least one biosurfactant, and/or at least one biosurfactant produced from at least one bacteria capable of producing a biosurfactant, the composition having a solids content of about 50% or above, in particular of about 50% to about 60%;
  pumping the fracturing fluid into the subterranean reservoir, thereby to fracture the subterranean reservoir to recover hydrocarbons from the fractured subterranean reservoir.

In some embodiments, the fracturing fluid further comprises a proppant.

In some embodiments, the subterranean reservoir has at least one well installed therein.

The at least one well, in some embodiments, is an injection well.

In another aspect of the invention, there is provided a fracturing or fracking fluid comprising lignin, in particular technical lignin, and at least one isolated strain of bacteria capable of producing at least one biosurfactant, and/or at least one biosurfactant produced from at least one isolated strain of bacteria capable of producing a biosurfactant, the composition having a solids content of about 50% or above, in particular of about 50% to about 60%.

In some embodiments, the fracturing or fracking fluid further comprises a catholyte solution.

In some embodiments, the catholyte solution is a stabilized or upgraded catholyte solution.

The invention extends to the use of lignin, in particular technical lignin, in a fracturing or fracking fluid for fracturing a subterranean reservoir to recover hydrocarbons from the fractured subterranean reservoir.

Other aspects and features of the present disclosure will become apparent, to those ordinarily skilled in the art, upon review of the following description of specific embodiments of the disclosure.

BRIEF DESCRIPTION OF THE DRAWINGS

The invention will now be described in more detail, by way of example only, with reference to the accompanying drawings in which.

DESCRIPTION OF PREFERRED EMBODIMENTS

Figure 1:
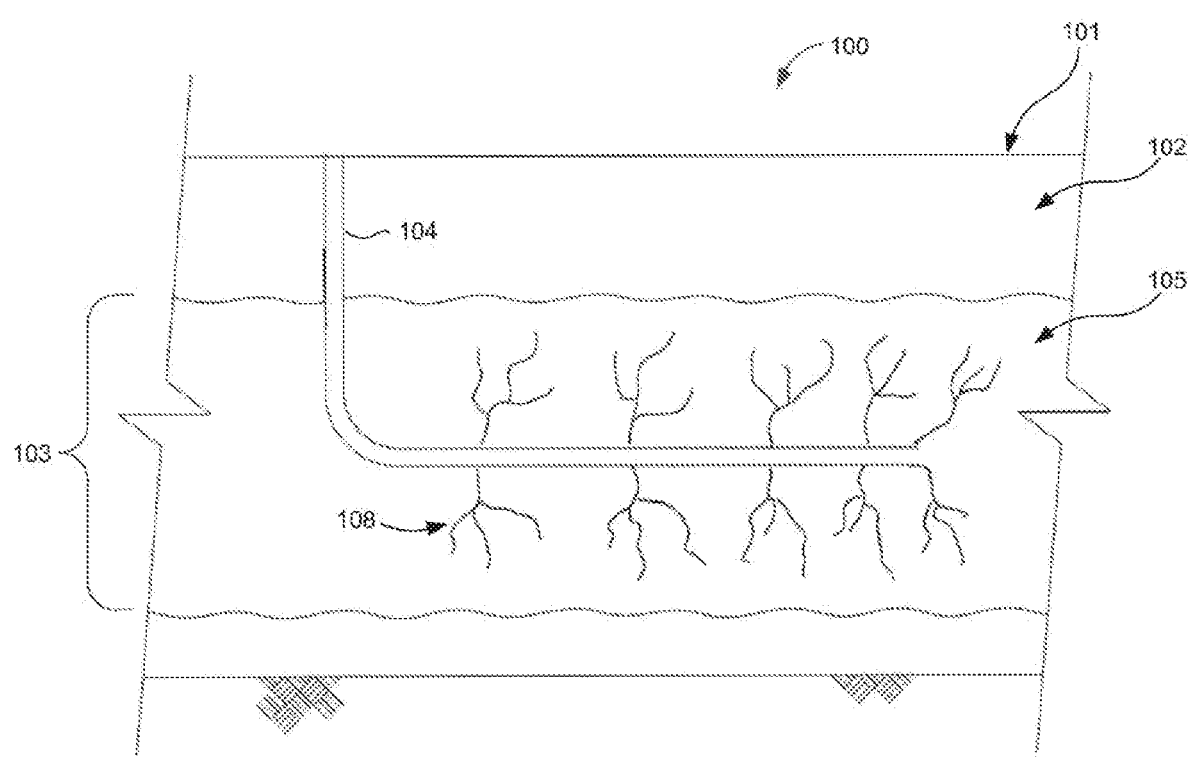
FIG. 1 is a side view diagram of an example system that may implement one or more embodiments of the methods for fracturing a subterranean formation disclosed herein.

The fracturing or fracking fluids of the invention, in particular lignin-based fracturing or fracking fluids, are provided for fracturing a subterranean reservoir for recovering hydrocarbons from the reservoir, in particular a so-called unconventional reservoir.

As used herein, "fracturing fluid" or "fracking fluid", which are used interchangeably, refer to a fluid used in hydraulic fracturing. Hydraulic fracturing involves high-pressure injection of the fracking fluid into a wellbore to create cracks in rock formations through which hydrocarbons such as oil or natural gas may flow more freely.

As used herein, "lignin" refers to a biopolymer that is found in the secondary cell wall of plants and some algae. Lignin is a complex cross-linked phenolic polymer with high heterogeneity. Typical sources for the lignin include, but are not limited to: softwood; hardwood; and herbaceous plants such as corn stover, bagasse, grass, and straw, for example.

In some embodiments, the lignin comprises technical lignin. As used herein, "technical lignin" refers to lignin that has been isolated from lignocellulosic biomass, for example, as a byproduct of a pulp and paper production or a lignocellulosic biorefinery.

Technical lignins may have a modified structure compared to native lignin and may contain impurities depending on the extraction process. In some embodiments, the technical lignin comprises at least one of Kraft lignin, lignosulfonates, soda lignin, organosolv lignin, steam-explosion lignin, and enzymatic hydrolysis lignin. In other embodiments, the technical lignin may comprise any other form of technical lignin.

In embodiments where the lignin comprises lignosulfonates, the lignosulfonates may be in the form of a salt including, for example, sodium lignosulfonate, calcium lignosulfonate, or ammonium lignosulfonate.

In other embodiments, the technical lignin is in the form of unhydrolyzed Kraft black liquor. Black liquor is a byproduct of the Kraft process and may contain not only lignin but hemicellulose, inorganic chemicals used in the pulping process, and other impurities. In other embodiments, the technical lignin is in the form of "brown liquor" (also referred to as red liquor, thick liquor and sulfite liquor) which refers to the spent liquor of the sulfite process. In other embodiments, the technical lignin may be in the form of any other spent cooking liquor of a pulping process or any other suitable lignin-based byproduct.

In other embodiments, the lignin may be synthetic lignin or any other suitable type of lignin.

In some embodiments, the lignin is hydrolyzed. As used herein, "hydrolyze" refers to using acid or base hydrolysis to at least partially separate lignin from the polysaccharide content of the lignocellulosic biomass. For example, where the lignin is in the form of black liquor, carbon dioxide may be used to precipitate Kraft lignin from the black liquor and then the Kraft lignin may be neutralized with sodium hydroxide.

In some embodiments, the lignin is in aqueous suspension. As used herein, an "aqueous suspension" of lignin refers to solid particles of lignin suspended, dispersed, and/or dissolved in a solvent that at least partially comprises water. In some embodiments, the solvent comprises substantially all water. In other embodiments, the solvent may comprise a combination of water and any other suitable solvent.

In some embodiments, the aqueous suspension of lignin may have a solids content of about 10% to about 90%, or about 25% to about 75%, or about 30% to about 60%, or about 33% to about 55%.%. In some embodiments, the aqueous suspension of lignin may have a solids content of about 50% to about 60%. In some embodiments, the aqueous suspension of lignin may have a solids content of about 10% or above, or of about 25% or above, or of about 30% or above, or of about 33% or above, or of about 50% or above. In some embodiments, the aqueous suspension of lignin may have a solids content of about 90% or below, or of about 75% or below, or of about 60% or below, or of about 55% or below. In some embodiments, the aqueous suspension has a solids content of about 46%. A solids content of about 33% to about 55% may allow the composition to be flowable, which may be preferred for some applications. In other applications, the composition may be used as a slurry and the solids content may be as high as about 85% to about 90%.

In some embodiments, the lignin comprises at least one of lignin nanoparticles and lignin microparticles. As used herein, "nanoparticle" refers to a particle in the nanometer size range, for example, between about 1 nm and about 100 nm, and "microparticle" refers to a particle in the micrometer size range, for example, between about 100 nm and about 1000 µm (1 mm). In some preferred embodiments, the lignin particles have a size of about 200 nm or less, or about 100 nm or less. In some preferred embodiments, at least about 20%, or at least 30%, or at least 40%, or at least 50%, or at least 60%, or at least 70%, or at least 80%, or at least 90% of the lignin particles are nanoparticles having a size of about 100 nm or less.

The lignin nanoparticles and/or microparticles can be produced by any suitable method. For example, the lignin nanoparticles and/or microparticles can be produced using at least one of: solvent shifting; pH shifting; cross-linking polymerization; mechanical treatment; ice-segregation; template based synthesis; aerosol processing; electro spinning; and carbon dioxide ($CO_2$) antisolvent treatment. Such methods are described in Beisl et al. "Lignin from Micro- to Nanosize: Production Methods" Int. J. Mol. Sci. 2017; 18:1244, incorporated herein by reference in its entirety.

In some preferred embodiments, lignin nanoparticles are produced using a pH shifting method, for example, as disclosed in Beisl et al. Briefly, the starting lignin material may be dissolved in a basic solution (e.g. an aqueous NaOH solution at pH 12) and the pH of the solution may be gradually decreased by addition of acid (e.g. $HNO_3$) to precipitate lignin nanoparticles. The solution may then be neutralized (e.g. by addition of NaOH) to re-suspend the nanoparticles. The resulting particles may have a size of about 200 nm or less, or about 100 nm or less. In other embodiments, the lignin nanoparticles may be produced by any other suitable method.

By providing the lignin in the form of lignin nanoparticles and/or microparticles, the surface area of the lignin is increased, thereby also increasing the negative force around each particle. In addition, lignin nanoparticles and/or microparticles may have improved solubility in water. Conventional lignins are typically only soluble in water at alkaline pH; however, nanoparticles and/or microparticles may be soluble in approximately neutral water (Beisl et al.), which may be preferred for some applications.

In some embodiments, where the lignin comprises an aqueous suspension of lignin nanoparticles, the zeta potential value of the suspension may be about −5 to about −80 mV. In some embodiments, the specific gravity of the aqueous suspension of lignin nanoparticles is between about 1.286 to about 1.7 SG.

The fracturing fluid further comprises at least one isolated strain of bacteria capable of biosurfactant production. As used herein, "isolated" or "isolate", when used in reference to a strain of bacteria, refers to bacteria that have been separated from their natural environment. In some embodiments, the isolated strain or isolate is a biologically pure culture of a specific strain of bacteria. As used herein, "biologically pure" refers to a culture that is substantially free of other organisms.

As used herein, "biosurfactant" refers to compounds that are produced at the bacterial cell surface and/or secreted from the bacterial cell and function to reduce surface tension and/or interfacial tension. Non-limiting examples of biosurfactants include: lipopeptides, surfactin, glycolipids, rhamnolipids, methyl rhamnolipids, viscosin, and the like. The isolated strain may be capable of producing one or more types of biosurfactant.

In some embodiments, the isolated strain may produce one or more additional active compounds. For example, the isolated strain may produce a biopolymer, solvent, acid, exopolysaccharide, and the like.

In some embodiments, the at least one isolated strain of bacteria comprises a strain of *Bacillus*. In other embodiments, the at least one isolated strain comprises a strain of bacteria capable of biosurfactant production and that is non-pathogenic. Non-limiting examples of suitable strains are listed in Satpute et al. "Methods for investigating biosurfactants and bioemulsifers: a review" *Critical Reviews in Biotechnology*, 2010, 1-18. For example, the at least one isolated strain of *Bacillus* may be *Bacillus amyloliquefaciens, Bacillus licheniformis, Bacillus pumilus, Bacillus subtilis*, or combinations thereof, and in particular *Bacillus licheniformis*.

In some embodiments, the pH of the fracturing fluid may be selected or adjusted to provide a suitable pH for the isolated strain(s). In some embodiments, the fracturing fluid may further comprise one or more nutrients to support growth of the bacteria such as, for example, acetate, one or more vitamins, and the like.

In some embodiments, the isolated strain is in a viable form. For example, in some embodiments, the isolated strain may be in the form of a liquid suspension. In some embodiments, the isolated strain may be incubated for a suitable period of time prior to incorporation into the composition such that at least a portion of biosurfactant(s) are secreted into the bacterial suspension and therefore can be incorporated into the composition. For example, the bacteria can be incubated/fermented for between about one day and about six months or longer. The isolated strain may be incubated in the presence of a nutrient source and under suitable conditions (e.g. temperature, agitation, etc.) to produce the biosurfactant(s).

In other embodiments, the isolated strain may be in a lyophilized (freeze-dried) form. In some embodiments, the freeze-dried form comprises freeze-dried spores.

In some embodiments, where the isolated strain is in the form of a liquid suspension or in a freeze-dried form, the composition may comprise approximately 40 billion CFU (colony forming units) may be combined with at least about 1 g of lignin and up to several tons of lignin.

In other embodiments, the isolated strain may in an inviable form. For example, the isolated strain may be in the form of heat-killed cells or a cell lysate. In these embodiments, the bacteria of the isolated strain may be incubated for a suitable period of time prior to loss of viability (e.g. heat killing or lysis) such that a sufficient quantity of biosurfactant(s) is/are secreted into the bacterial suspension for incorporation into the composition. For example, the bacteria may be incubated for at least one week prior to loss of viability.

In other embodiments, a liquid suspension of bacteria may be incubated to produce the biosurfactant(s) and a supernatant containing the biosurfactant(s) may be separated from the bacterial cells and used in the composition.

In some embodiments, the lignin-based fracturing or fracking fluids of the invention further comprise catholyte solutions. As used herein, "catholyte solution" is an activated solution produced in an electrochemical reaction, and is that part of the electrolyte solution adjacent the cathode of an electrochemical cell. It can be produced, for instance, from a 0.05%-1% salt brine (NaCl or KCl), and has a pH in the range 10.0 to 13.0 and an ORP/Redox value of less than about −800 mV, typically in the order of −900 to −950 mV. In the case of an NaCl starting solution, the active ingredient is highly active, and typically unstable, NaOH.

The fracturing or fracking fluids of the invention can comprise from about 1% to about 75% by volume of the catholyte solution.

In some embodiments, the fracturing fluid may be used as such. In other embodiments, the fracturing fluid may comprise other components. The fracturing fluid may additionally comprise a proppant, and in some embodiments may additionally comprise water and one or more chemical additives. Non-limiting examples of proppants include sand, treated sand, ceramic materials, and sintered bauxite. Non-limiting examples of chemical additives include: hydrochloric acid or acetic acid; sodium chloride; a friction reducer such as polyacrylamide; ethylene glycol; borate salts; sodium and/or potassium carbonates; guar gum; a biocide such as glutaraldehyde; a corrosion inhibitor such as citric acid; isopropanol; 2-butoxyethanol; methanol; and the like. In other embodiments, the fracturing fluid may comprise any other suitable additive.

In some embodiments, the fracturing fluid further comprises at least one of a carboxylic acid or a salt or ester thereof. In some embodiments, the carboxylic acid is a di-carboxylic acid or a salt or ester thereof. The carboxylic acid or salt/ester thereof may function as a solvent, for example, by facilitating formation of a stable emulsion of the various components of the composition. In some embodiments, the composition comprises a carboxylic acid ester. In some embodiments, the carboxylic acid ester comprises a methyl ester or a butyl ester. In some embodiments, the butyl esters are produced by biochemical metathesis. In some embodiments, the butyl ester comprises n-Butyl 4-oxopentanoate. In some embodiments, the methyl ester comprises unsaturated $C_{10}$ or $C_{12}$ methyl ester. In some embodiments, the methyl ester comprises methyl 9-decenoate or methyl 9-dodecenoate. In some embodiments, the methyl ester is produced from a plant oil feedstock.

In other embodiments the di-carboxylic acid or a salt or ester thereof may comprise at least one oleic acid or a salt or ester thereof. In some embodiments, the oleic acid or a salt or ester thereof may be provided in the form of "tall oil", a viscous liquid obtained as a byproduct of the Kraft process. In some embodiments, the tall oil may be distilled to tall oil rosin or tall oil fatty acid (TOFA) which comprise a higher proportion of oleic acids than tall oil.

In other embodiments, the carboxylic acid may comprise acetic acid and/or pyroligneous acid, as described in more detail below.

In some embodiments, the fracturing fluid comprises a combination of two or more carboxylic acids or salts/esters thereof. As one example, the composition may comprise a combination of one or more of: di-carboxylic acid, pyroligneous acid, and butyl esters produced by biochemical metathesis.

In some embodiments, the fracturing fluid may comprise about 1% to about 30%, or about 1% to about 20%, or about 1% to 10% of di-carboxylic acid and/or pyroligneous acid and/or butyl esters by volume.

In some embodiments, the fracturing fluid further comprises pyroligneous acid. Pyroligneous acid is also known as wood vinegar or wood acid. The pyroligneous acid may be produced by fast pyrolysis, slow pyrolysis, or any other suitable process. The pyroligneous acid may be produced from any suitable biomass such as, for example, beech biomass. As one example, the pyroligneous acid may be supplied by Nettenergy™ (CAS number 8030-97-5). In some embodiments, the pyroligneous acid comprises about 2% to about 20% acetic acid, or about 5% to about 10% acetic acid, or about 7% acetic acid. In some embodiments, the pyroligneous acid comprises about 2% or above or about 5% or above, and/or about 20% or below or about 10% or below acetic acid. In other embodiments, an aqueous solution of pure or relatively pure acetic acid at the concentrations listed above may be used in place of the pyroligneous acid. The pyroligneous acid may function as a solvent to facilitate dissolution of the composition into the hydrocarbon-containing material in the methods described below. In some embodiments, the composition may comprise about 1% to about 50%, or about 10% to about 40%, or about 30% pyroligneous acid by volume. In some embodiments, the composition may comprise about 1% or above or about 10% or above pyroligneous acid by volume. In some embodiments, the composition may comprise about 50% or less or about 40% or less pyroligneous acid by volume.

In some embodiments, the fracturing fluid further comprises carbon black. The carbon black may be electroconductive carbon black and the carbon black may function to increase the conductivity of the composition. In some embodiments, the carbon black may be conductive, superconductive, extraconductive or ultraconductive carbon black. In some embodiments, the carbon black may be in the form of carbon black beads, microparticles, and/or nanoparticles. For example, the carbon black may comprise Printex™ XE2 B Beads from Orion Engineered Carbons™. In some embodiments, the composition may comprise about 0.5% to about 10% carbon black by volume. In some embodiments, addition of carbon black may increase the negative zeta potential of the composition thereby increasing its electrical stability. In other embodiments, the composition may comprise any other highly conductive microparticle and/or nanoparticle.

Optionally, the fracturing fluid may further comprise pyrolysis oil. Pyrolysis oil may also be referred to as wood oil. The pyrolysis oil may be produced by fast pyrolysis, slow pyrolysis, or any other suitable process. The pyrolysis oil may be produced from any suitable biomass such as, for example, beech biomass. The pyrolysis oil may act as an odorant to mask the smell of the lignin in the composition. The composition may comprise about 0.1% to about 2%, or about 0.2% to about 1%, or about 0.5% pyrolysis oil by weight. The composition may comprise about 0.1% or above about 0.2% or above pyrolysis oil by weight. The composition may comprise about 2% or less or about 1% or less pyrolysis oil by weight.

In some embodiments, the fracturing fluid is gasified with a gas. As used herein, "gasified" refers to introduction of a gas into the composition such that bubbles of the gas are suspended therein. The term "aerated" refers to gasifying with air or oxygen. The gas may be selected based on the aerobic or anaerobic nature of the isolated strain(s) incorporated into the composition. In some embodiments, the gas at least partially comprises oxygen. For example, the gas may be air or relatively pure oxygen. In some embodiments, the gas may at least partially comprise carbon dioxide and/or nitrogen. Gasification may function to provide oxygen and/or other suitable gasses directly or in close proximity to the bacterial cells of the isolated strain. Gasification may promote proliferation of the bacterial cells and allow the composition to be used or stored for an extended period of time. In some embodiments, the aerated composition may have a half-life of about 20 to 30 days.

In some embodiments, the fracturing fluid is gasified with nanobubbles and/or microbubbles of the gas. As used herein, "nanobubble" refers to bubbles in the nanometer range and "microbubble" refers to bubbles in the micrometer range. The nanobubbles and/or microbubbles may be introduced into the composition by any suitable means including, for example, a micro- or nanobubble nozzle or a venturi tube.

It has surprisingly been found that using a stabilized or upgraded as opposed to an otherwise unstable catholyte solution enhances the action of the fracturing or fracking fluids of the invention. Accordingly, in some embodiments, the catholyte solution is pre-treated in a system that is designed to introduce nitrogen gas into the catholyte solution, in particular in the form of nano- and/or micro-bubbles, for incorporation into a fracturing or fracking fluid of the invention.

Accordingly, in some embodiments, the catholyte solution is upgraded prior to blending with the other components of the separation composition.

In some embodiments, the fracturing fluid may comprise any other suitable components. For example, in some embodiments, the fracturing fluid may further comprise at least one nutrient source for the live bacteria of the isolated strain.

Without being limited by theory, it is believed that the combination of lignin and the biosurfactant produced by the isolated strain act to mimic the natural habitat of the biosurfactant producing strains. The lignin may function as a growth substrate that contains required nutrients (carbon and fructose) to support growth of the bacteria, with the exception of additional acetate and metallic vitamins which may be added to the fracturing as needed.

In addition, a series of drop collapse tests were conducted to evaluate additional benefits of combining the lignin with a suitable biosurfactant in the composition of the invention. In particular, the tests were carried out to determine the effectiveness of the compositions of the invention in reducing the surface tension of water and other liquids. The results indicated that a further advantage in combining the lignin and biosurfactant in the composition of the invention is a significant reduction in surface tension at concentrations of between about 10 ppm and 300 ppm of the biosurfactant, which assists significantly in the fracturing or fracking fluids ability to cut through hydrocarbon containing materials.

Therefore, in some embodiments, a relatively non-toxic, inert, and sustainable fracturing fluid is provided. The fracturing fluid may also be relatively low cost as lignin is a waste product of pulp and paper operations that is typically discarded.

FIG. 1 shows an example system 100, according to some embodiments, that may implement one or more embodiments of fracturing methods described herein. The example system 100 may comprise at least one well 104 installed in a subterranean reservoir 102, in an earth formation 101, having a pay interval 103. The pay interval 103 may be in a rock formation 105. In some embodiments, the rock formation 105 may comprise porous rock such as sandstones, limestones, or dolomite rocks. In other embodiments, the rock formation 105 may comprise shale rock or a coal bed. The reservoir 102 may be a conventional or unconventional reservoir. In some embodiments, the reservoir 102 is a coalbed methane reservoir.

The well 104 may be used to pump fracking fluid into the reservoir 102, thereby forming fractures 108 in the rock formation 105. The fractures 108 may provide pathways for oil and/or gas to flow back to the well 104 to be produced to surface. In this embodiment, the well 104 is a horizontal well. In other embodiments, the well 304 may be a vertical well. In some embodiments, multiple wells 104 may be installed in the same reservoir 102.

In some embodiments, pumping trucks (not shown) may be used to transport the fracking fluid to the well 104 and pump the fracking fluid into the reservoir 102 via the well 104. In other embodiments, the fracking fluid may be transported to the well 104 by a pipeline or any other suitable means and pumped into the reservoir 102 by any suitable pumping means.

In some embodiments, the hydrocarbons produced by the well 104 may be received at a surface storage facility (not shown) or may be transported by truck to a downstream location.

Figure 2:
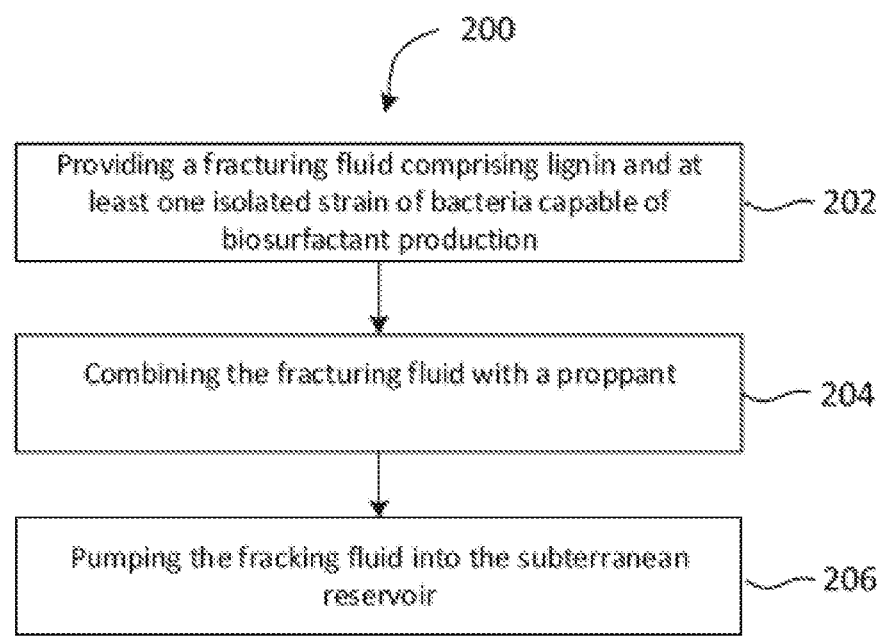
FIG. 2 is a flowchart of an example method for fracturing a subterranean formation, according to some embodiments.

FIG. 2 is a flowchart of an example method 200 for fracturing a subterranean reservoir. The method 200 may be implemented using the system 100 of FIG. 1.

At block 202, a fracturing fluid comprising lignin and an isolated strain of bacteria capable of producing at least one biosurfactant is provided. The fracturing fluid may be any embodiment of the fracturing fluid described above, including embodiments where the fracturing fluid further comprises a catholyte solution.

At block 204, the fracturing fluid is combined with a proppant. The proppant may comprise sand (e.g. silica sand), treated sand, ceramic materials, sintered bauxite, or any other suitable proppant.

In some embodiments, the fracturing fluid is combined with the proppant at a ratio of about 2:1 proppant to fracturing fluid. In other embodiments, the fracturing fluid and proppant may be combined at any suitable ratio.

In some embodiments, one or more chemical additives may also be added to the fracturing fluid. The chemical additive may be any of the chemical additives listed above.

In some embodiments, the fracturing fluid may contain relatively low quantities of water. For example, about 20% or less, about 10% or less, or about 5% or less of the fracturing fluid may comprise water. The fracturing fluid may therefore be in the form of a viscous slurry. In some embodiments, the specific gravity of the fracturing fluid is between about 1.5 about 1.7 SG.

In other embodiments, additional water may be added to achieve a desired viscosity of the fracturing fluid.

In some embodiments, the fracturing fluid is formed offsite and is transported to the well 104 to be pumped into the well 104 at block 206 described below. In other embodiments, the composition and proppant may individually be transported to the well 104 and combined onsite to form the fracking fluid. In other embodiments, the composition and proppant may be pumped into the well 104 at substantially the same time such that the fracking fluid is formed in the well 104.

At block 206, the fracturing fluid is pumped into the reservoir 102 via the well 104. The fracturing fluid may be pumped into the reservoir 102 at a suitable pressure to fracture the rock formation 105. The fracturing fluid may be pumped into the reservoir 102 for a suitable period to generate and extend the fractures 108 in the rock formation 105 such that the hydrocarbons within the reservoir 102 may flow back to the well 104. The pumping of the fracturing fluid may then be ceased and the hydrocarbons flowing back to the well 104 may be produced to surface.

Various modifications besides those already described are possible without departing from the concepts disclosed herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Although particular embodiments have been shown and described, it will be appreciated by those skilled in the art that various changes and modifications might be made without departing from the scope of the disclosure. The terms and expressions used in the preceding specification have been used herein as terms of description and not of limitation, and there is no intention in the use of such terms and expressions of excluding equivalents of the features shown and described or portions thereof.

The invention claimed is:

1. A method for fracturing a subterranean reservoir having low permeability and/or porosity, the method comprising:
providing a fracturing fluid comprising lignin and at least one isolated strain of bacteria capable of producing at least one biosurfactant, and/or at least one biosurfactant produced from at least one isolated strain of bacteria capable of producing a biosurfactant, the fracturing fluid having a solids content of about 50% or above; and
injecting the fracturing fluid under high pressure into the subterranean reservoir having low permeability and/or porosity, thereby producing a fractured subterranean reservoir and increasing the flow of hydrocarbons from the fractured subterranean reservoir for recovery.

2. A method according to claim 1, wherein the fracturing fluid further comprises a catholyte solution and/or a proppant.

3. A method according to claim 1, wherein the subterranean reservoir has at least one well installed therein, and wherein the fracturing fluid is injected into the subterranean reservoir via the at least one well.

4. A method according to claim 3, wherein the at least one well is an injection well.

5. A method according to claim 1, wherein the lignin comprises lignin nanoparticles and lignin microparticles.

6. A method according to claim 1, wherein the lignin includes lignin particles, at least 20% of the lignin particles being lignin nanoparticles.

7. A fracturing fluid suitable for fracturing a subterranean reservoir having low permeability and/or porosity according to the method of claim 1, the fracturing fluid comprising: lignin and at least one isolated strain of bacteria capable of producing at least one biosurfactant, and/or at least one biosurfactant produced from at least one isolated strain of bacteria capable of producing a biosurfactant, the fracturing fluid having a solids content of about 50% or above and being able to withstand high pressure injection into the subterranean reservoir having low permeability and/or porosity.

8. The fracturing fluid according to claim 7, further comprising a catholyte solution and/or a proppant.

9. The fracturing fluid of claim 7, wherein the lignin is technical lignin, comprising at least one of Kraft lignin, lignosulfonates, soda lignin, organosolv lignins, steam-explosion lignin, enzymatic hydrolysis lignin, or unhydrolyzed Kraft black liquor lignin.

10. The fracturing fluid of claim 7, wherein the lignin is in an aqueous suspension.

11. The fracturing fluid of claim 7, wherein the lignin comprises lignin nanoparticles and lignin microparticles.

12. The fracturing fluid of claim 7, wherein the lignin includes lignin particles, at least 20% of the lignin particles being lignin nanoparticles.

13. The fracturing fluid of claim 7, wherein the at least one isolated bacteria strain comprises at least one isolated strain of *Bacillus* selected from the group consisting of *Bacillus amyloliquefaciens, Bacillus licheniformis, Bacillus pumilus, Bacillus subtilis*, and combinations thereof.

14. The fracturing fluid of claim 7, wherein the at least one isolated bacteria strain is in the form of a liquid suspension or freeze-dried spores.

15. The fracturing fluid of claim 7, further comprising at least one of a carboxylic acid or a salt or ester thereof.

16. The fracturing fluid of claim 15, wherein the carboxylic acid ester comprises a methyl ester or a butyl ester.

17. The fracturing fluid of claim 15, wherein the carboxylic acid or salt or ester thereof comprises a di-carboxylic acid or a salt or ester thereof.

18. The fracturing fluid of claim 7, further comprising carbon black and/or pyroligneous acid and/or pyrolysis oil.

19. The fracturing fluid of claim 7, wherein the fracturing fluid is gasified with at least one of nanobubbles and microbubbles.

\* \* \* \* \*